United States Patent
Nakano

(10) Patent No.: US 8,307,702 B2
(45) Date of Patent: Nov. 13, 2012

(54) TIRE RIM-ASSEMBLING MECHANISM, RIM-ASSEMBLING METHOD OF TIRE, AUTOMATIC VISUAL INSPECTION EQUIPMENT OF TIRE, AND AUTOMATIC VISUAL INSPECTION METHOD OF TIRE

(75) Inventor: Ryohei Nakano, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 147 days.

(21) Appl. No.: 12/866,334

(22) PCT Filed: Jan. 26, 2009

(86) PCT No.: PCT/JP2009/051181
§ 371 (c)(1),
(2), (4) Date: Aug. 5, 2010

(87) PCT Pub. No.: WO2009/098959
PCT Pub. Date: Aug. 13, 2009

(65) Prior Publication Data
US 2011/0011171 A1    Jan. 20, 2011

(30) Foreign Application Priority Data
Feb. 6, 2008  (JP) .................................. 2008-026072

(51) Int. Cl.
*G01M 17/02* (2006.01)
(52) U.S. Cl. ........................................................ 73/146
(58) Field of Classification Search .......... 73/146–146.8
See application file for complete search history.

(56) References Cited

U.S. PATENT DOCUMENTS

| | | | |
|---|---|---|---|
| 2005/0188755 A1* | 9/2005 | Cargould et al. | 73/146 |
| 2007/0084275 A1* | 4/2007 | Gotou et al. | 73/146 |
| 2007/0220964 A1* | 9/2007 | Shinomoto et al. | 73/146 |
| 2008/0216567 A1* | 9/2008 | Breed | 73/146.5 |
| 2011/0113875 A1* | 5/2011 | Okada et al. | 73/146 |
| 2011/0203362 A1* | 8/2011 | Imamura et al. | 73/146 |
| 2011/0226050 A1* | 9/2011 | Nakayama et al. | 73/146 |

FOREIGN PATENT DOCUMENTS

| | | |
|---|---|---|
| JP | A-9-126956 | 5/1997 |
| JP | A-10-73518 | 3/1998 |
| WO | WO 03/048718 A1 | 6/2003 |

OTHER PUBLICATIONS

International Search Report dated Mar. 17, 2009 in International Application No. PCT/JP2009/051181 (with translation).

* cited by examiner

*Primary Examiner* — Andre Allen
(74) *Attorney, Agent, or Firm* — Oliff & Berridge, PLC

(57) ABSTRACT

Disclosed is automatic visual inspection equipment of a tire in which eccentricity of a rim-assembled tire is prevented by preventing the tire from being deformed by the load of an upperrim. An upper rim is previously pulled up to the side of a main shaft by an upper rim pull-up mechanism, which is fixed to the side of a main shaft. The lower rim is elevated up to the upper rim to fix the upper rim to the tire, and the rim-assembled tire is fixed to the main shaft. Only the upper rim pull-up mechanism is lowered and visual inspection of the tire is performed by rotating the main shaft. A positioning means is provided and includes a positioning pin and a positioning hole provided between the upper surface of an upper rim connector and the lower end surface of the upper rim fixing portion of the main shaft.

14 Claims, 9 Drawing Sheets

TIRE RIM-ASSEMBLING MECHANISM, RIM-ASSEMBLING METHOD OF TIRE, AUTOMATIC VISUAL INSPECTION EQUIPMENT OF TIRE, AND AUTOMATIC VISUAL INSPECTION METHOD OF TIRE

TECHNICAL FIELD

The present invention relates to a tire rim-assembling mechanism, a rim-assembling method of tire, an automatic visual inspection equipment of tire and an automatic visual inspection method of tire, specifically relates to a tire rim-assembling mechanism, a rim-assembling method of tire, an automatic visual inspection equipment of tire and an automatic visual inspection method of tire arranged so that eccentricity of tire is minimized by preventing deformation of tire due to load of an upper rim which is fixed to the tire to be inspected and through adjustment of position of the upper rim and a main shaft to rotate the tire.

BACKGROUND ART

For inspection of scratches or dirt on tire, automatic visual inspection equipment of tire is generally known, which automatically inspect visual appearance of tire through shooting an image of tire surface by setting up an imaging device such as a CCD camera, for example, in an inspection line.

In this automatic visual inspection equipment, since the inspection (or measurement) is performed while a tire to be inspected is rotated, an upper rim and a lower rim are fixed to the tire and the tire in that condition is connected to a main shaft which is coupled with a motor and the like.

In conventional automatic visual inspection equipment of tire, the upper rim is fixed to the tire from upper side thereof, the tire being placed substantially in horizontal way, hence the weight of the upper rim causes deformation of tire when rim-assembly is carried out in this manner for a tire with low rigidity. Deformation of tire generates a misalignment of the upper rim with respect to the main shaft. If the main shaft is rotated in this state, the tire rotates with eccentricity (the amount of eccentricity is not less than 0.3 mm) and such a situation occurs as the image object goes out of a visual field, which causes difficulty of image analysis which follows thereafter.

Although FIGS. 7 to 9 are not described in patent documents, there is shown a process of tire rim-assembling according to a rim-assembling mechanism in the aforementioned conventional automatic visual inspection equipment of tire.

The conventional rim-assembling mechanism includes a lower rim 300 which is fixed to the lower surface of tire T, an elevating device (not shown) of the lower rim 300, an upper rim 200, and a main shaft 100 which is rotatable and coupled to a motor, for example, that is not shown in the drawing.

At the lower end of the main shaft body 100, an upper rim fixing portion 120 is provided via a smaller diameter portion 110. On the top surface of the upper rim 200, a corresponding protruding conical surface 220 is formed, which engages with a concave conical surface that is formed on an upper rim fixing portion 120 of the main shaft 100 via a connecting portion 210 with small diameter.

In other words, when the upper rim 200 and the main shaft 100 are connected, connection and positioning are performed in combination of mating tapered surfaces with each other of the main shaft 100 and the above mentioned conical surface 220 of the upper rim 200.

In the above-mentioned conventional automatic inspection equipment of tire, when the upper and lower rim is fixed onto the tire T, firstly, as shown in FIG. 7, in a state that the tire T is fixed on the lower rim 300, the lower rim 300 is elevated up by an elevating mechanism (not shown).

Subsequently, as shown in FIG. 8, the upper surface of the tire T is connected to the upper rim 200. After connection of the upper rim 200, the rim-assembled tire T is elevated up further in a state that the tire T is subjected to the load of the upper rim 200, so as to engage and integrate the conical surface 220 at the upper end of the connecting portion 210 formed integrally with the upper rim 200 and the concave conical surface formed in the upper rim fixing portion 120 at the lower end of the main shaft 100.

Next, after the tire T is rim-assembled and connected to the main shaft (in a condition where the tire T is inflated and press-contacted onto the main shaft), the main shaft 100 is rotated, for example, with a motor as shown in FIG. 9 so that the rim-assembled tire T which is fixed thereto is rotated, and necessary inspection is carried out by shooting it with a fixed camera.

In conventional automatic visual inspection equipment of tire, the upper rim 200 is fixed from above onto the tire T which is placed horizontally as described above, and thereby weight of the upper rim 200 is directly applied on the tire T. Hence, the tire T is deformed if the rigidity of the tire T is small compared with the tire weight. When the tire T is deformed, the upper rim 200 placed on the tire T also causes displacement, hence when it is fixed to the main shaft 100, a delicate displacement is generated between the main shaft 100 and the axis of tire. When the tire T is rotated in that condition, the tire T is eccentrically-rotated.

When the amount of eccentricity reaches, for example, more or less 0.3 mm, shooting of the tire T with a camera provided at a fixed position may cause such a problem as a predetermined shooting object goes out of the visual field of the camera.

DISCLOSURE OF THE INVENTION

Problems to be Solved by the Invention

The present invention has been implemented to solve the above conventional problems. An object is to perform an accurate inspection and the like of a tire with a camera, through an accurate rim-assembly and restriction of eccentricity of tire while rotating.

Means to Solve the Problems

The present invention is a tire rim-assembling mechanism in which an upper rim is fixed for rim assembly to a tire to which a lower rim has been fixed, comprising: a main shaft which is connected to the upper rim to rotate the tire; and an upper rim pull-up mechanism provided in the main shaft for pulling up the upper rim to join it to the main shaft, and an automatic visual inspection equipment of tire provided with the tire rim-assembling mechanism.

The present invention is also a rim-assembling method of tire, comprising the steps of: pulling up an upper rim to position and join it to a main shaft; and elevating a tire to which a lower rim is fixed to connect it to the upper rim, and an automatic visual inspection method of tire, comprising the steps of: rotating a tire rim-assembled by such rim-assembling method; and inspecting the rotating tire.

Effect of the Invention

According to the present invention, since the load of the upper rim is not applied to the tire in rim assembling, the tire does not deform. In addition, since positioning of the upper rim and the main shaft with which the upper rim is joined can be implemented accurately, the amount of eccentricity can be very small when rotating the rim-assembled tire. Resultantly, visual inspection of tire can be performed accurately.

DESCRIPTION OF THE REFERENCE SYMBOLS

1: tire rim-assembling mechanism in automatic visual inspection equipment of a tire, 10, 100: main shaft, 10a: upper rim fixing portion, 12: upper rim pull-up ring, 14: upper rim pull-up cylinder, 16: shaft, 18: positioning pin, 20, 200: upper rim, 22: connecting portion, 24: upper rim connector, 26: positioning hole, 30, 300: lower rim, T: tire

BEST MODES FOR CARRYING OUT THE INVENTION

An embodiment of automatic visual inspection equipment of tire according to the present invention will be described referring to drawings.

Figure 1:
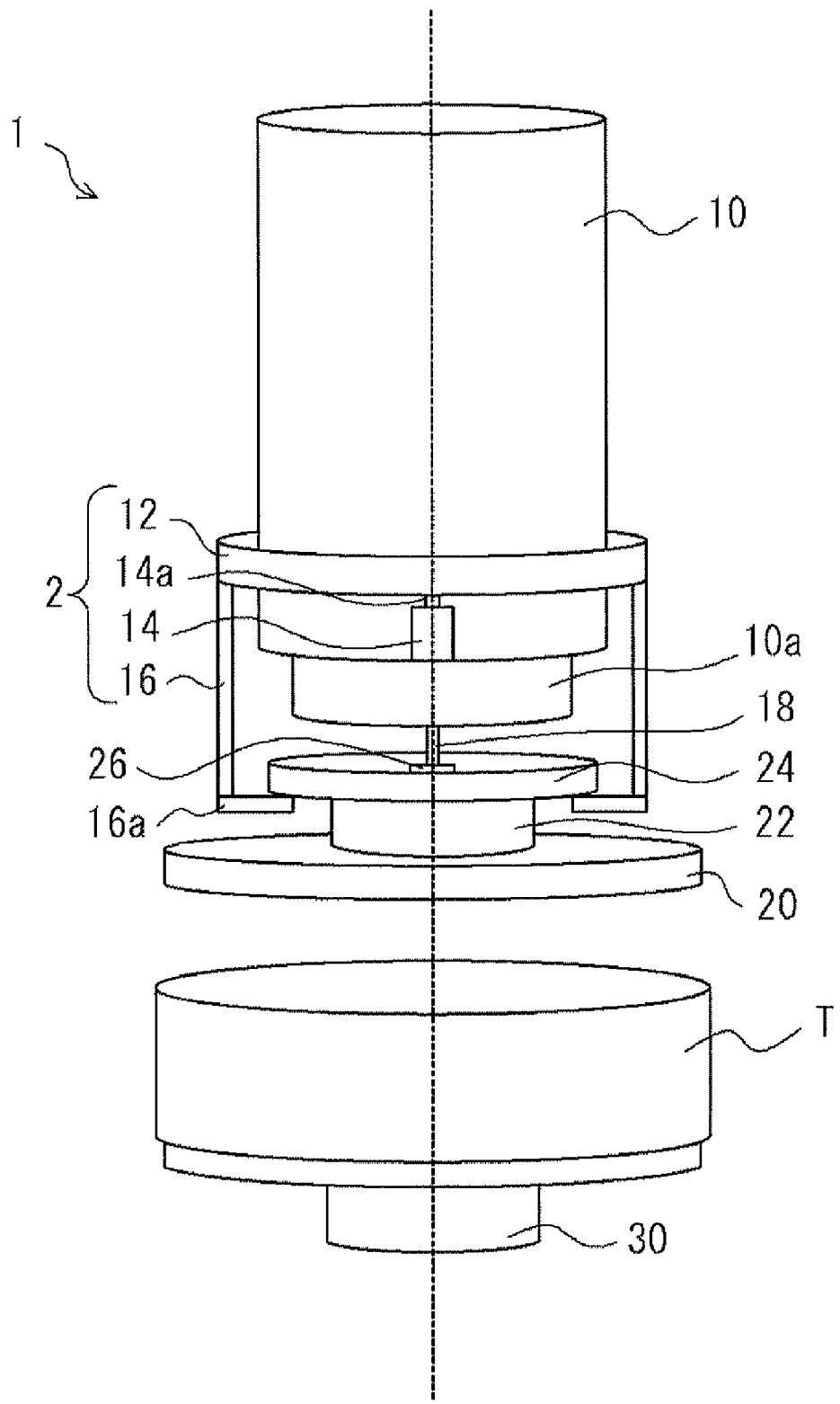
FIG. 1 is a front view of a tire rim-assembling mechanism according to an embodiment of the present invention.
Figure 2:
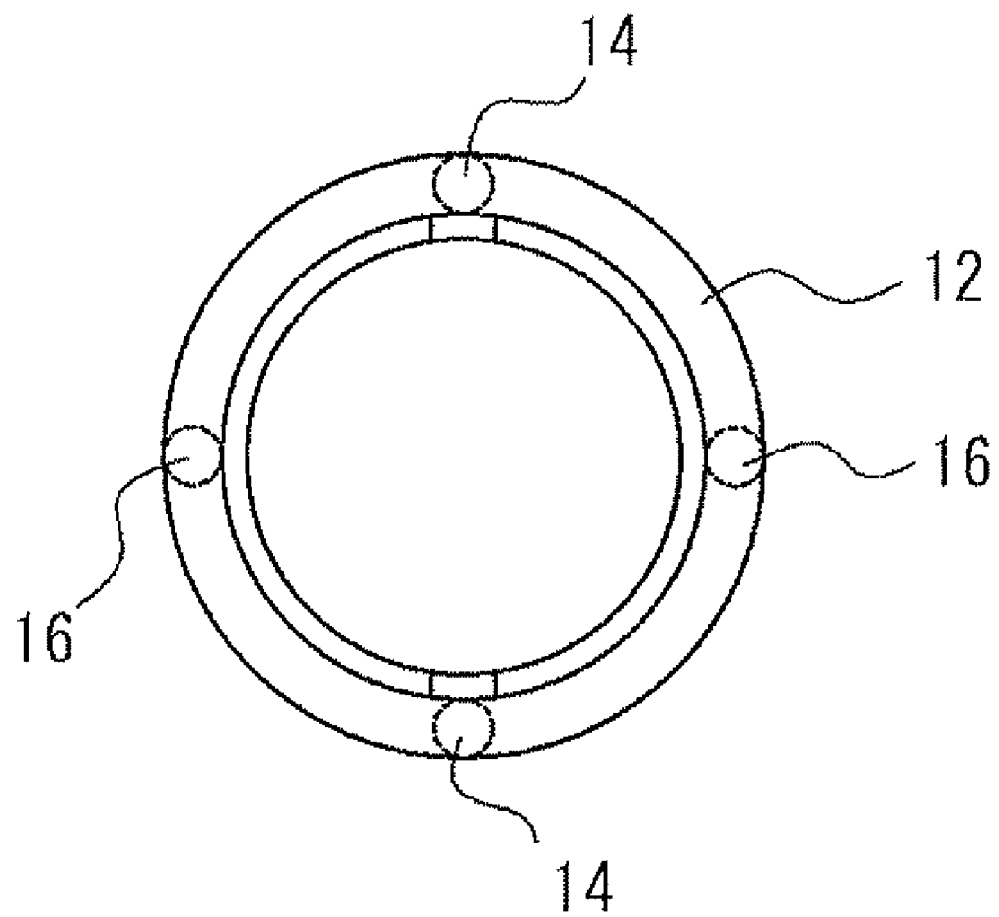
FIG. 2 is a plan view of the rim-assembling mechanism of FIG. 1.

FIG. 1 is a front view of a tire rim-assembling mechanism of automatic visual inspection equipment of tire according to an embodiment of the present invention, and FIG. 2 is a plan view thereof.

A tire rim-assembling mechanism 1 in automatic visual inspection equipment of a tire includes a main shaft 10, an upper rim 20 and a lower rim 30.

The main shaft 10 has a cylindrical shape and is connected to a motor (not shown), to be rotated by the motor drive. An upper rim pull-up mechanism 2 is fixed to the main shaft 10.

The upper rim pull-up mechanism 2, as clearly shown in FIG. 2, comprises: an upper rim pull-up ring 12 which is disposed along the circumference of the main shaft 10 in co-axial state therewith; an elevating device, such as cylinders 14 as an elevating device which are fixed on outer peripheral surface of the main shaft 10 at positions of phase 0 degree and phase 180 degrees with respect to one point on periphery of the upper rim pull-up ring 12, wherein the cylinder 14 is composed of a pair of cylinders 14, pistons 14a of which are connected to a lower surface of the upper rim pull-up ring 12; and shafts 16, which are engaging means, provided on the upper rim pull-up ring 12 at positions of phase angle 90 degrees and phase angle 270 degrees, that is, phase angle distance of 90 degrees from the above-mentioned pair of cylinders 14 respectively, extending downward from the upper rim pull-up ring 12, having claws 16a for pulling-up the upper rim as an engaging means at the lower end thereof.

The lower end portion of the main shaft 10 is formed as an upper rim fixing portion 10a which has a smaller diameter than the main shaft 10 and extends downward from the main body of main shaft, and a positioning pin 18 is provided protruding downwardly at the central portion of lower surface of the upper rim fixing portion 10a.

At the upper surface side of the upper rim 20, a connecting portion 22 and an upper rim connector 24 are formed integrally and coaxially, both of which have smaller diameters than the upper rim 20, the upper rim connector 24 having a larger diameter than the connecting portion 22. As shown in FIG. 1, since the connecting portion 22 is formed with the diameter smaller than that of the upper rim connector 24, the upper rim connector 24 has a flange-like step portion formed at the lower surface thereof to which the upper rim pull-up claws 16a can be hooked.

At the central portion of upper surface of the upper rim connector 24, a positioning hole 26 is provided corresponding to the positioning pin 18 so as to allow the positioning pin 18 to enter the hole 26. In the state shown in the drawing, the positioning pin 18 has been already inserted in the positioning hole 26.

By the way, the positioning pin 18 may be provided on the upper rim connecter 24 and the positioning hole 26 may be provided in the upper rim fixing portion 10a of the main shaft 10.

The lower rim 30 is identical with a conventional one. That is to say, it is fixed to an elevating device (not shown), and the upper surface side thereof is fixed to the tire T to be inspected.

Furthermore, the automatic visual inspection equipment of tire according to the present invention is provided with a tire rim-assembling mechanism as described above, for example, a CCD camera, a data processing unit which processes image data taken by the CCD camera, a memory unit which stores the processed image data, an analysis unit which analyzes the image data, a display unit and the like, but for the parts other than the above described tire rim-assembling mechanism, a known structure of a conventional tire inspection equipment is used.

Figure 3:
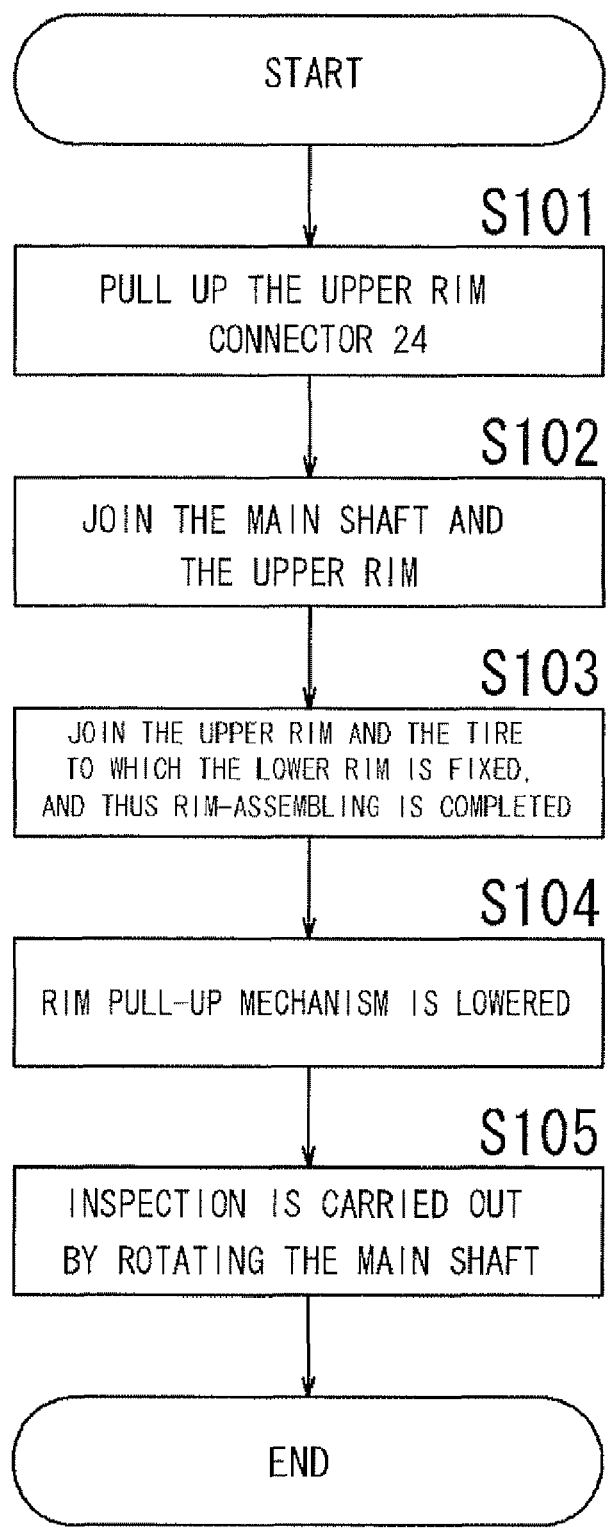
FIG. 3 is a flow chart illustrating a rim-assembling process of the tire rim-assembling mechanism.
Figure 4:
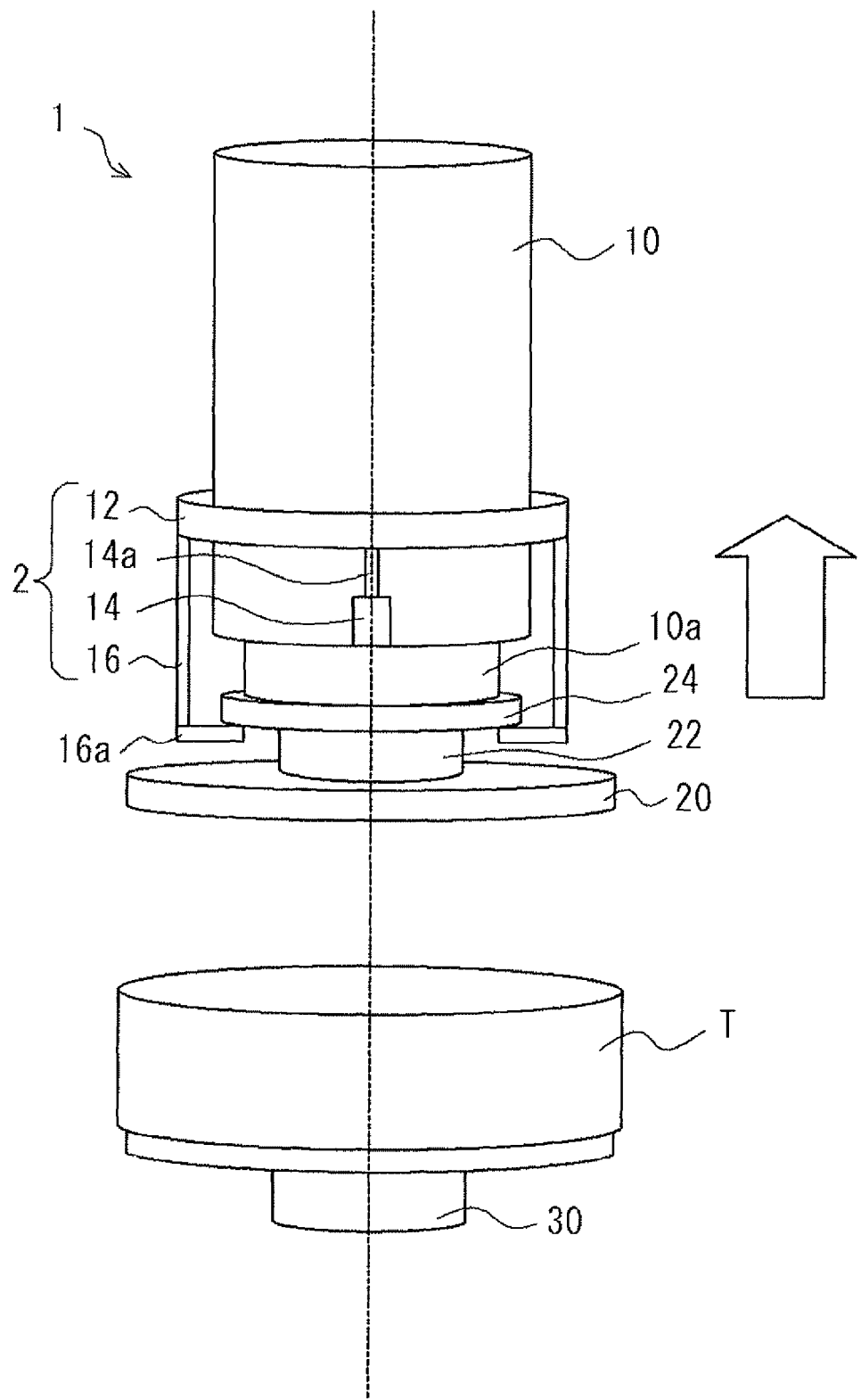
FIG. 4 is a front view of a rim-assembling mechanism showing a process of fixing an upper rim to a main shaft in the tire rim-assembling mechanism.

Next, operation of the rim-assembling mechanism 1 in the automatic visual inspection equipment of tire and visual inspection of rim-assembled tire described so far will be explained referring to a flow chart of FIG. 3. It should be noted that FIG. 4 is a front view of the rim-assembling mechanism showing a process of fixing the upper rim to the main shaft in the tire rim-assembling mechanism, FIG. 5 is similarly a front view of the tire rim-assembling mechanism showing a process of pulling up the tire to which the lower rim has been fixed and fixing it to the upper rim, and FIG. 6 is a front view of the rim-assembling mechanism showing an inspection process of lowering the upper rim pull-up mechanism down to the predetermined position for main shaft rotation and thereafter rotating the rim-assembled tire for inspection.

The upper rim 20 is in such situation that, as shown in FIG. 1, claws 16a of the shafts 16 of the main shaft 10 hook the flange-like portion to the rear surface of upper rim connector 24.

In this situation, when the pistons 14a of the cylinder 14 for pulling the upper rim are elevated, the shafts 16 are elevated via the upper rim pull-up ring 12 so that the pull-up claws 16a at the lower end thereof pull up the upper rim connector 24 (3101). At that time, the positioning pin 18 of the upper rim connector 24 has been inserted into the positioning hole 26 provided at the corresponding position with the upper rim connector 24, thereby both are coming closer through guidance of the positioning means, the lower surface of the upper rim fixing portion 10a of the main shaft 10 and the upper surface of the upper rim connector 24, each surface being formed to be plane, are closely joined together (3102). In other words, in such condition as the lower end portion of the upper rim fixing portion 10a of the main shaft 10 comes closely into contact with the upper surface of the upper rim connector 24, the upper rim 20 is connected to the main shaft 10.

Figure 5:
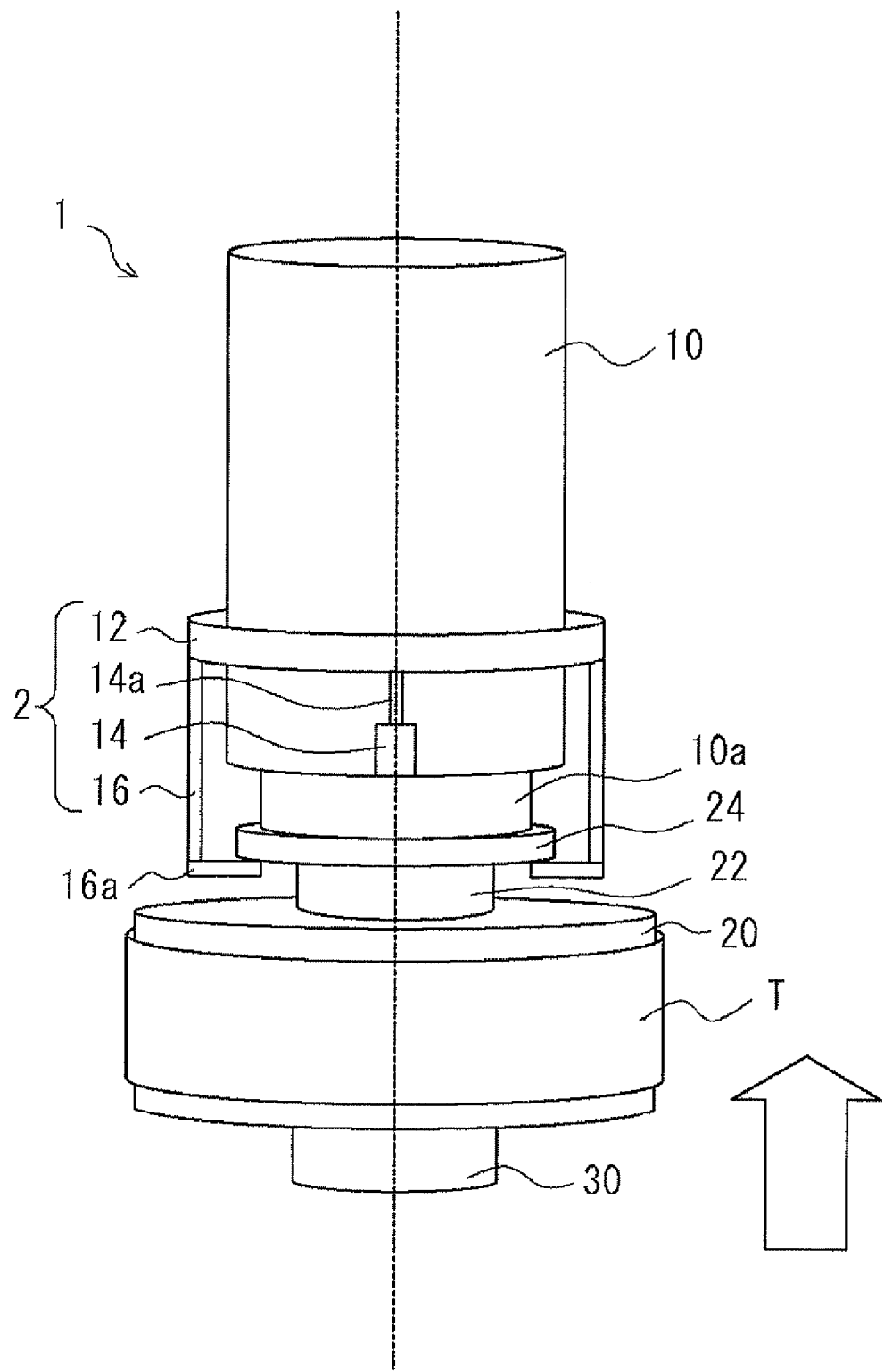
FIG. 5 is a front view of a tire rim-assembling mechanism showing a process of elevating a tire to which a lower rim has been fixed and fixing the tire to the upper rim in the tire rim-assembling mechanism.
Figure 6:
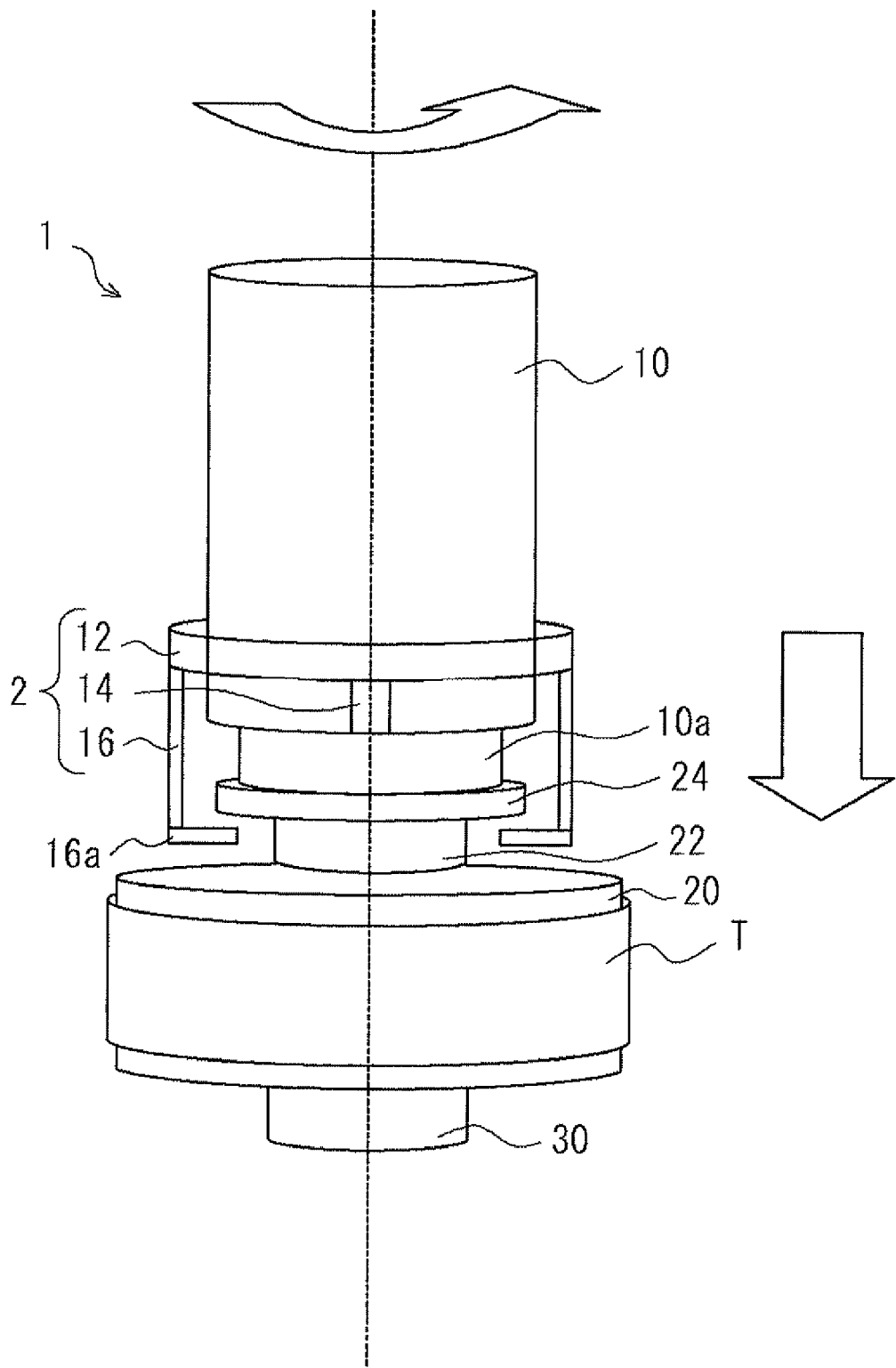
FIG. 6 is a front view of a rim-assembling mechanism showing an inspection process of lowering an upper rim pull-up mechanism down to the predetermined position for main shaft rotation, and thereafter rotating the rim-assembled tire for inspection, in the tire rim-assembling mechanism.

Next, the lower rim 30 fixed in such condition as the tire T is placed thereon is elevated by an elevating mechanism (not shown) to a level being joined with the upper rim 20 (S103), and as shown in FIG. 5, the upper rim 20 is fixed on the upper side of the tire T, whereby rim-assembly of the tire T is completed.

Subsequently, inspection of tire, for which rim-assembly has been completed as described above, is carried out. That is to say, rim-assembly is confirmed at a stage where rim-assembly has been completed, after which only the upper rim pull-up mechanism 2 is lowered (S104), and as shown in FIG. 6, the tire is inspected at that position, or inspection with camera is carried out while the main shaft is rotating (S105). In this visual inspection of tire, visual appearance of tire is shot, for example, with a CCD camera and analysis and the like is carried out based on image data obtained. Processing of these image data and so on is identical with conventional tire visual inspection.

According to the above embodiment, the upper rim 20 is pulled up by the upper rim pull-up mechanism 2 to be connected with the main shaft 10 on each flat surface integrally and tightly, therefore not only the main shaft 10 can be placed stably on the upper rim connector 24, but also the weight of the upper rim does not affect the tire T directly while rim assembling. In addition, the main shaft 10 and the upper rim 20 are positioned by the positioning means comprised of the positioning pin 18 and the positioning hole 26. Hence, the upper rim connector 24 can be connected with the main shaft 10 in the determined position without fail, and displacement of the both can be avoided.

Here, the diameter of the positioning hole 26 is set larger, for example, by 0.2 mm than that of the positioning pin 18, which can keep eccentricity equal to or less than 0.1 mm.

It should be noted that the conventional rim fixing method using the rim-assembling mechanism of the present embodiment, for example, shown in FIG. 6, that is to say, such rim-fixing method to fix the tire T to the main shaft 10 in a state where the upper rim 20 is fixed to the tire T, is difficult to carry out, although it is not impossible. This is because when the tire T is to be fixed to the main shaft 10 in a state where the upper rim 20 is fixed to the tire T, unless a position of the positioning pin 18 of the upper rim fixing portion 10a and a position of the positioning hole 26 of the upper rim connector 24 are well aligned, considerable force is applied onto the tire T in fixing operation, and thus there is a risk that the tire T is deformed.

Figure 7:
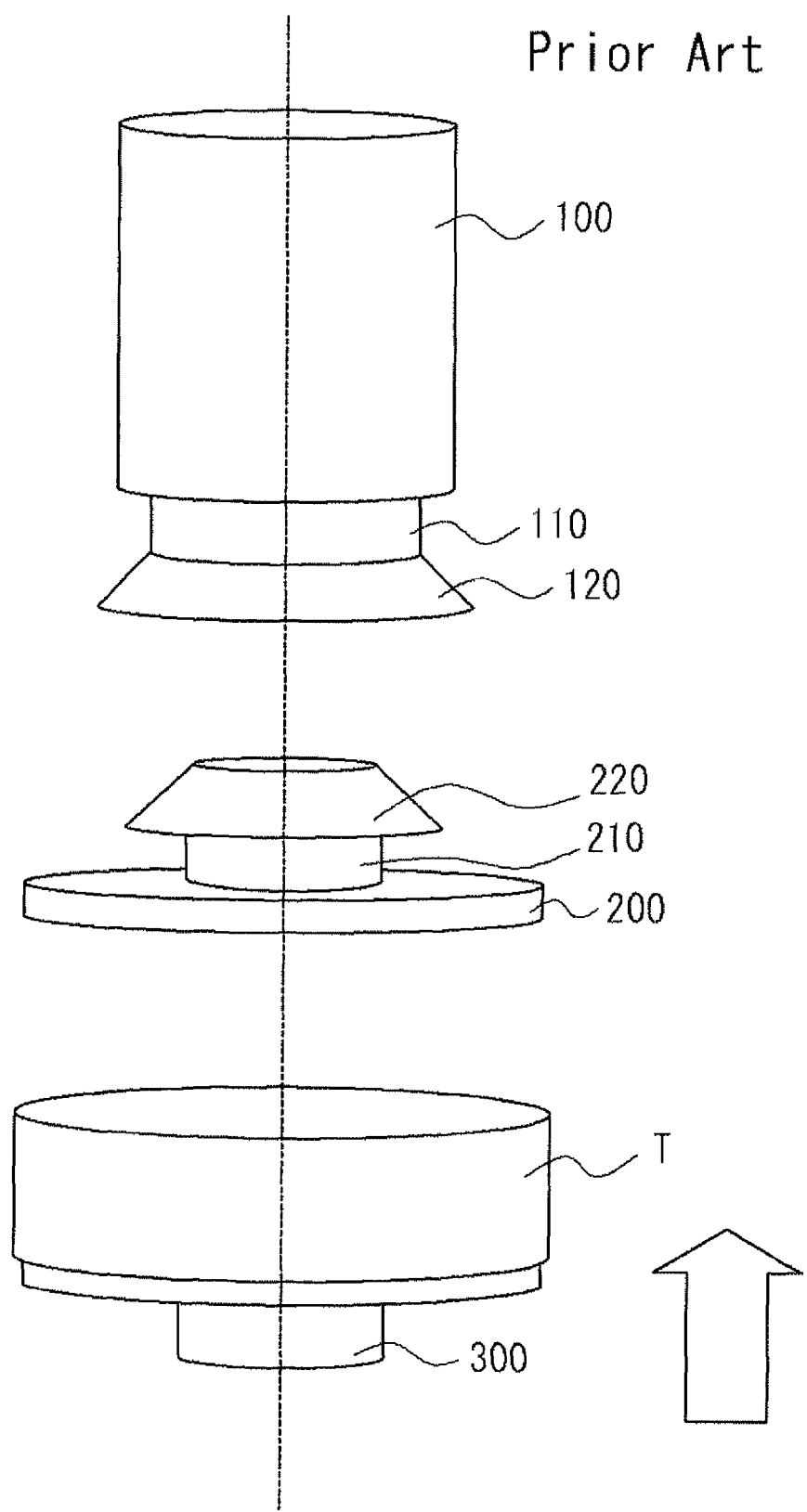
FIG. 7 is a front view of a conventional tire rim-assembling mechanism, showing a process of elevating a tire to which a lower rim has been fixed toward an upper rim.
Figure 8:
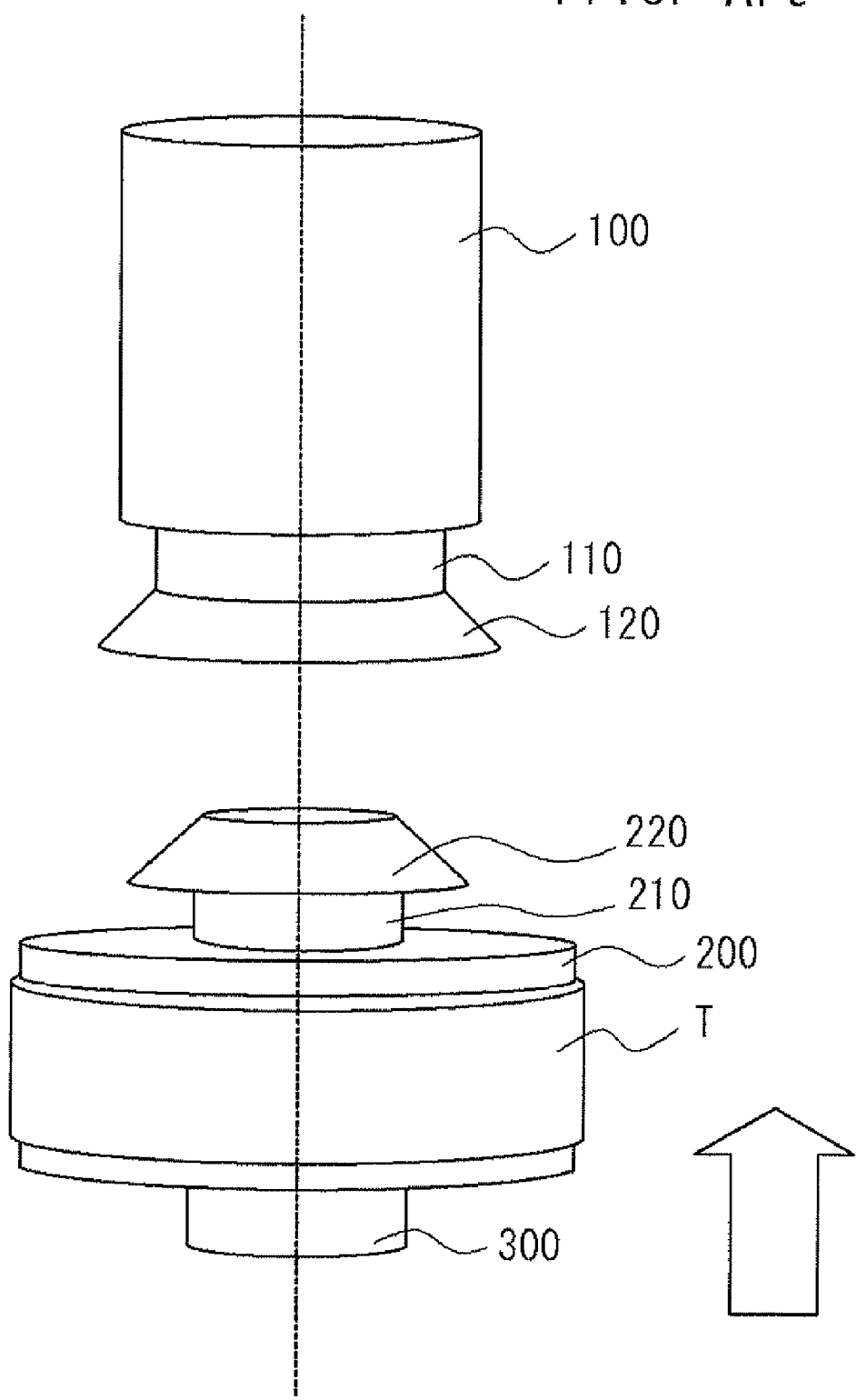
FIG. 8 is a front view of a conventional tire rim-assembling mechanism, showing a process of connecting a tire to which a lower rim has been fixed to an upper rim and further elevating the tire toward the main shaft.
Figure 9:
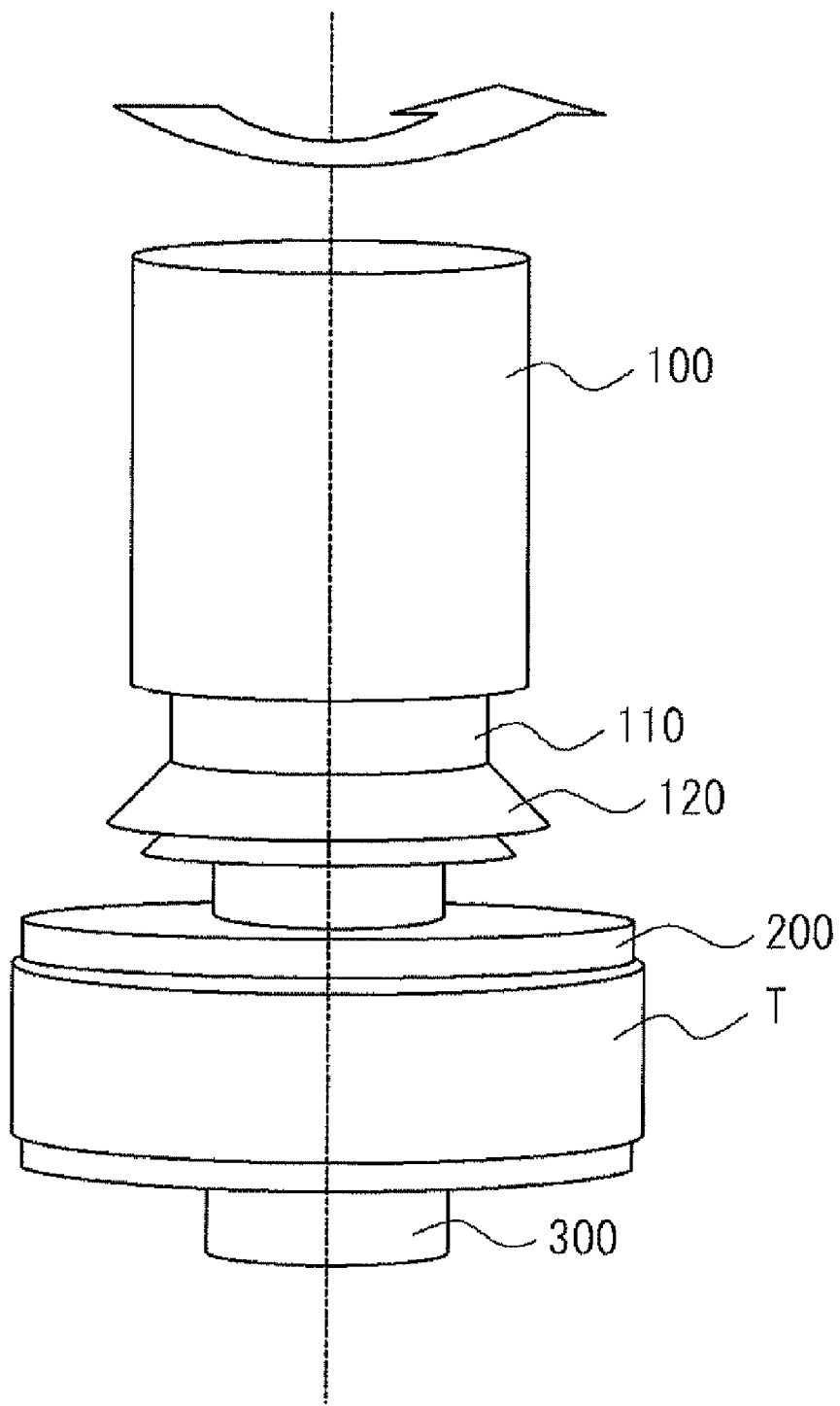
FIG. 9 is a front view of a conventional tire rim-assembling mechanism, showing a process of rotating the rim-assembled tire by a main shaft.

Consequently, in case where the above mentioned conventional rim fixing method is employed when the tire T is fixed to the main shaft, such structure has to be adopted in which the main shaft 100 and the upper rim 200 (hence tire T) can slide, using the conventional tire rim-assembling mechanism shown in FIG. 7 so that extensive force may not be applied on the tire T.

However, in this fixing structure it is required to provide clearance between conical surface 220 of the upper rim 200 and conical concave portion formed in the upper rim fixing portion 120. Consequently, there is a limit in positioning accuracy.

On the other hand, when the rim assembling method is adopted according to the present invention such that the upper rim 20 is joined to the main shaft 10 firstly, and then the tire T is connected to the upper rim 20, extensive force on the tire T is not generated when fixing of the main shaft 10 and the upper rim 20 even if the rim-assembling mechanism shown in FIG. 6 is adopted. Thus, generation of deformation on the tire T can be avoided preferably. In addition, fixing accuracy of tire T is higher in case of using the tire rim-assembling mechanism according to the present embodiment shown in FIG. 6 than the case of using the conventional tire rim-assembling mechanism shown in FIG. 7. Thus, visual inspection with more accuracy can be achieved.

The invention claimed is:

1. A tire rim-assembling mechanism in which an upper rim is fixed for rim assembly to a tire to which a lower rim is fixed, comprising:
    a main shaft which is connected to the upper rim to rotate the tire; and
    an upper rim pull-up mechanism provided in the main shaft for pulling up the upper rim to join it to the main shaft.

2. The tire rim-assembling mechanism according to claim 1, wherein
    the rim pull-up mechanism includes an engaging means to engage the upper rim, and an elevating device to move the engaging means vertically.

3. The tire rim-assembling mechanism according to claim 1, wherein
    the upper rim and the main shaft are provided with a positioning means to position the upper rim and the main shaft for joining them together.

4. The tire rim-assembling mechanism according to claim 3, wherein
    the positioning means includes a positioning pin provided on a joint surface of the upper rim and the main shaft and a fitting hole of the pin.

5. An automatic visual inspection equipment of tire comprising the tire rim assembling mechanism according to claim 1.

6. A rim-assembling method of tire, comprising the steps of:
    pulling up an upper rim to position and join it to a main shaft; and
    elevating a tire to which a lower rim is fixed to connect it to the upper rim.

7. An automatic visual inspection method of tire, comprising the steps of:
    rotating a tire rim-assembled by the rim-assembling method according to claim 6; and
    inspecting the rotating tire.

8. The tire rim-assembling mechanism according to claim 2, wherein
    the upper rim and the main shaft are provided with a positioning means to position the upper rim and the main shaft for joining them together.

9. The tire rim-assembling mechanism according to claim 8, wherein
the positioning means includes a positioning pin provided on a joint surface of the upper rim and the main shaft and a fitting hole of the pin.

10. An automatic visual inspection equipment of tire comprising the tire rim assembling mechanism according to claim 2.

11. An automatic visual inspection equipment of tire comprising the tire rim assembling mechanism according to claim 3.

12. An automatic visual inspection equipment of tire comprising the tire rim assembling mechanism according to claim 4.

13. An automatic visual inspection equipment of tire comprising the tire rim assembling mechanism according to claim 8.

14. An automatic visual inspection equipment of tire comprising the tire rim assembling mechanism according to claim 9.

* * * * *